US00RE35287E

United States Patent [19]

Caruso

[11] E Patent Number: Re. 35,287

[45] Reissued Date of Patent: Jul. 2, 1996

[54] HAIR CURLER

[76] Inventor: Richard Caruso, 7801 Montgomery Ave., Elkins Park, Pa. 19117

[21] Appl. No.: 116,213

[22] Filed: Sep. 2, 1993

Related U.S. Patent Documents

Reissue of:

[64] Patent No.: 4,453,554
Issued: Jun. 12, 1984
Appl. No.: 464,538
Filed: Feb. 7, 1983

U.S. Applications:

[63] Continuation of Ser. No. 374,934, Jun. 29, 1989, abandoned.

[51] Int. Cl.[6] ..... A45D 6/14

[52] U.S. Cl. ..... 132/251; 132/245

[58] Field of Search ..... 132/251, 252, 132/226, 228, 243, 245, 254, 250, 248

[56] References Cited

U.S. PATENT DOCUMENTS

| | | | |
|---|---|---|---|
| D. 190,543 | 6/1961 | Hoffmann et al. | D86/10 |
| D. 204,355 | 4/1966 | Solomon | D86/10 |
| D. 215,129 | 9/1969 | Talge | D86/10 |
| D. 244,881 | 6/1977 | Berkowitz | D28/37 |
| 582,563 | 5/1897 | Wegefarth . | |
| 1,442,260 | 1/1923 | Fister | 132/40 |
| 1,631,989 | 6/1927 | Tabb | 132/233 |
| 1,652,356 | 12/1927 | Hammerly | 132/35 |
| 1,775,440 | 9/1930 | Peavler . | |
| 1,895,815 | 1/1933 | Peterson . | |
| 1,906,756 | 5/1933 | Keele . | |
| 1,939,323 | 12/1933 | Slavick | 132/36 |
| 2,002,840 | 5/1935 | Stein et al. | 132/36 |
| 2,087,604 | 7/1937 | Mosher | 132/33 |
| 2,106,355 | 1/1938 | Ligot | 132/36 |
| 2,145,539 | 1/1939 | Bottorf | 132/38 |
| 2,171,956 | 9/1939 | Urs | 132/33 |
| 2,254,239 | 9/1941 | Norman | 132/33 |
| 2,409,081 | 10/1946 | Torrens | 132/31 |
| 2,429,176 | 10/1947 | Watson | 132/40 |
| 2,600,727 | 6/1952 | Berman et al. | 132/40 |
| 2,747,585 | 5/1956 | Allen | 132/12 |
| 2,828,753 | 4/1958 | Pileggi et al. | 132/42 |
| 2,833,293 | 5/1958 | Parker | 132/112 |
| 2,892,460 | 6/1959 | Leclabart . | |
| 2,910,989 | 11/1959 | Russell | 132/40 |
| 2,937,649 | 5/1960 | Gresham et al. . | |
| 3,016,909 | 1/1962 | Schrock | 132/40 |
| 3,220,423 | 11/1965 | Zinzel | 132/41 |
| 3,258,016 | 6/1966 | Roepnack | 132/40 |
| 3,265,075 | 8/1966 | Edman et al. | 132/9 |
| 3,347,248 | 10/1967 | Weitzner . | |
| 3,348,554 | 10/1967 | Solomon | 132/39 |
| 3,433,233 | 3/1969 | Thackeray | 132/40 |
| 3,455,309 | 7/1969 | Koss | 132/33 |
| 3,470,888 | 10/1969 | Kuhn | 132/40 |
| 3,523,542 | 8/1970 | Elsier | 132/33 |
| 3,572,350 | 3/1971 | Adams et al. | 132/39 |
| 3,656,490 | 4/1972 | Grossman | 132/39 |
| 3,667,482 | 6/1972 | Morgan | 132/9 |
| 3,759,271 | 9/1973 | Caruso | 132/233 |
| 3,766,930 | 10/1973 | Madsen et al. | 132/33 |
| 3,858,588 | 1/1975 | Walter et al. | 132/33 |
| 3,877,471 | 4/1975 | Boyd | 132/9 |
| 4,135,525 | 1/1979 | Kriger | 132/39 |
| 4,164,951 | 8/1979 | Shaler et al. | 132/31 R |
| 4,202,360 | 5/1980 | Walter | 132/40 |
| 4,224,955 | 9/1980 | Meyerhoefer et al. | 132/33 |
| 4,258,732 | 3/1981 | Mariani et al. | 132/41 R |
| 4,284,877 | 8/1981 | Abura et al. | 219/222 |
| 4,318,419 | 3/1982 | Puckett | 132/40 |
| 4,627,452 | 12/1986 | Caruso | 132/252 |

FOREIGN PATENT DOCUMENTS

| | | | |
|---|---|---|---|
| 700617 | 12/1964 | Canada . | |
| 48031 | 11/1933 | Denmark . | |
| 0046887 | 7/1981 | European Pat. Off. . | |
| 046887 | 3/1983 | European Pat. Off. . | |
| 585153 | 2/1925 | France . | |
| 0800169 | 6/1936 | France | 132/228 |
| 1318776 | 12/1963 | France . | |
| 1366819 | 12/1964 | France . | |
| 1387219 | 12/1965 | France . | |
| 2239966 | 3/1975 | France . | |
| 596209 | 4/1934 | Germany . | |
| 142791 | 4/1935 | Germany . | |
| 1020161 | 11/1957 | Germany . | |
| 1046846 | 12/1958 | Germany . | |
| 2030489 | 1/1972 | Germany . | |
| 2338330 | 2/1975 | Germany . | |
| 2636250A1 | 2/1978 | Germany . | |
| 53-6897 | 3/1978 | Japan . | |

| | | | |
|---|---|---|---|
| 6058844 | 7/1983 | Japan . | |
| 58-116312 | 7/1983 | Japan . | |
| 296190 | 1/1954 | Switzerland . | |
| 281294 | 9/1970 | U.S.S.R. . | |
| 328495 | 5/1930 | United Kingdom . | |
| 357608 | 10/1931 | United Kingdom . | |
| 401191 | 11/1933 | United Kingdom . | |
| 449400 | 6/1936 | United Kingdom . | |
| 505093 | 5/1939 | United Kingdom . | |
| 591071 | 8/1947 | United Kingdom . | |
| 728460 | 4/1955 | United Kingdom . | |
| 962906 | 7/1964 | United Kingdom . | |
| 0962906 | 7/1964 | United Kingdom | 132/251 |
| 1051933 | 12/1966 | United Kingdom . | |
| 1206938 | 9/1970 | United Kingdom . | |
| 1394628 | 5/1975 | United Kingdom . | |
| 2061721 | 5/1981 | United Kingdom . | |
| 2117636 | 10/1983 | United Kingdom . | |
| 1012743 | 1/1984 | United Kingdom . | |
| 2129294 | 5/1984 | United Kingdom . | |

OTHER PUBLICATIONS

Celeste Co., Inc., *Molecular Hair Rollers® Make Hot Rollers Obsolete,* 2 pages.

Brochure entitled, "The Richard Caruso Molecular Hair Vapor Rollers", Celeste Company, Inc., 1981.

*Primary Examiner*—John G. Weiss
*Attorney, Agent, or Firm*—Woodcock, Washburn, Kurtz, Mackiewicz & Norris

[57] ABSTRACT

A hair curler for subjecting hair to steam to effect a curling action includes a hollow perforated core surrounded by a compressible porous foam pad. A generally semicylindrical shield has notches in end walls for receiving the core.

21 Claims, 3 Drawing Sheets

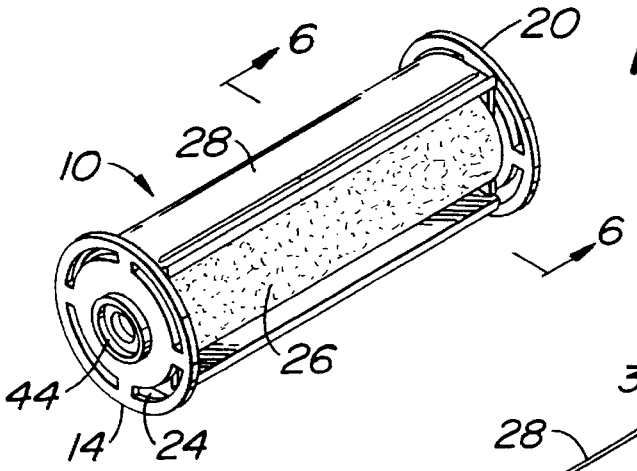
FIG. 1
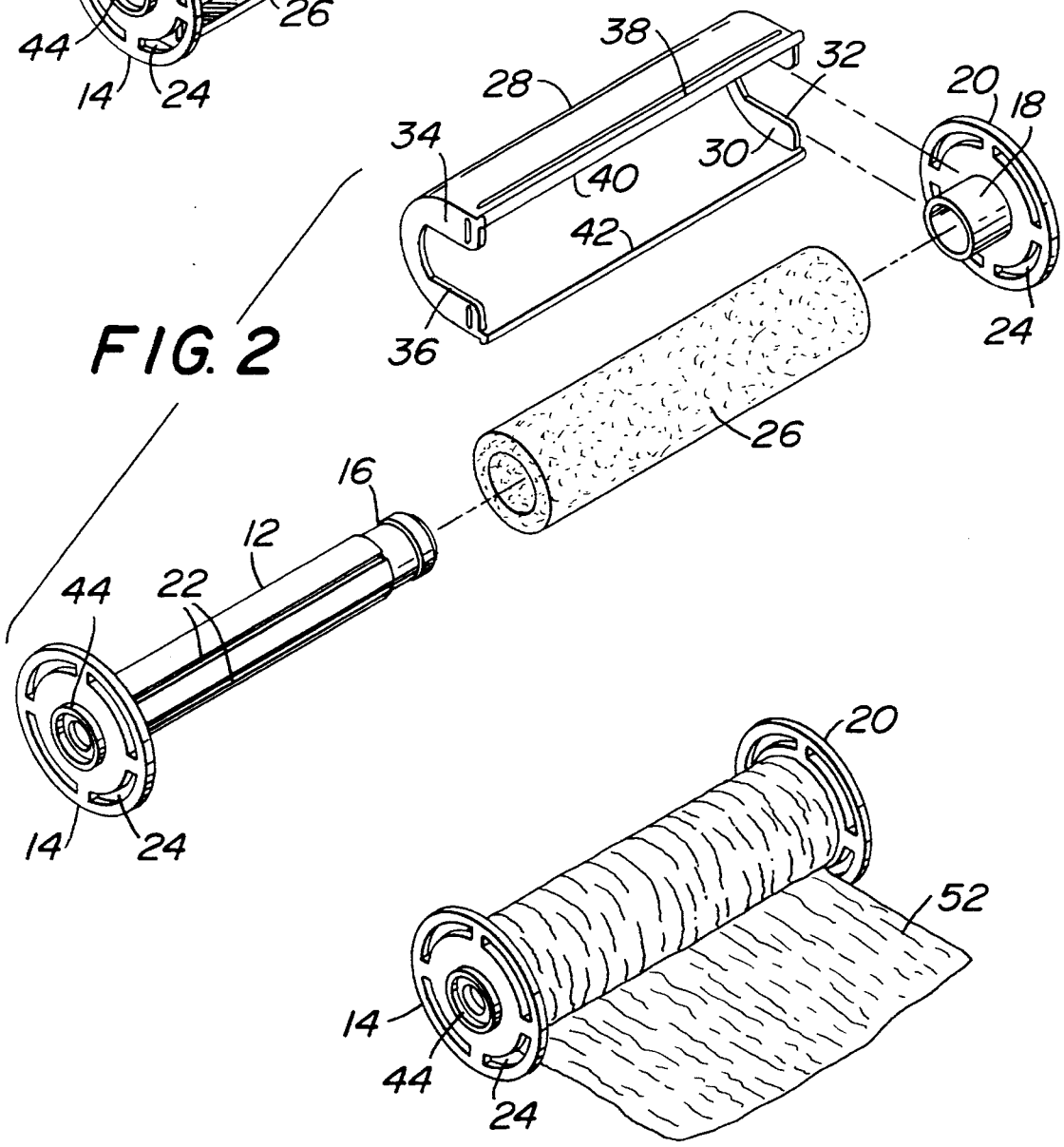
FIG. 2
FIG. 3

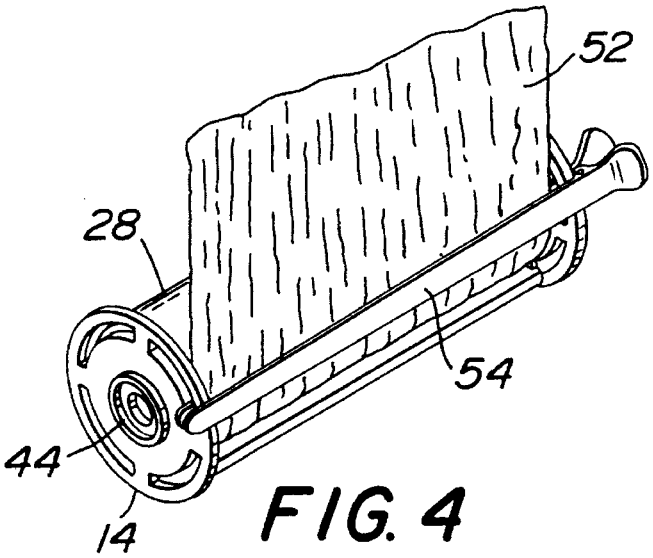
FIG. 4
FIG. 5
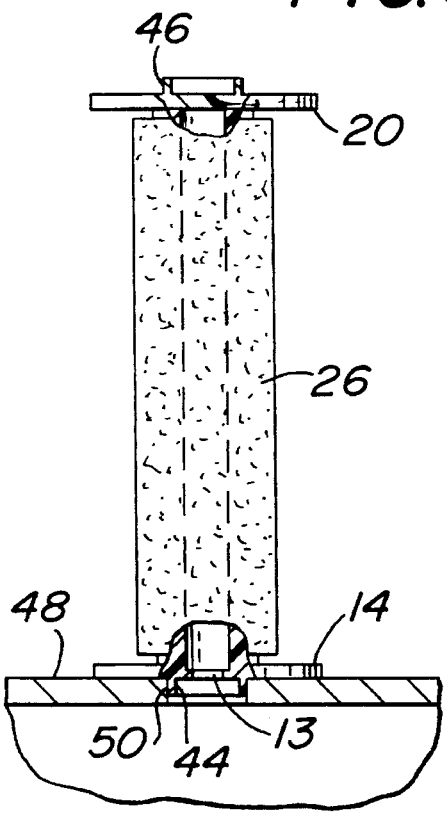
FIG. 6
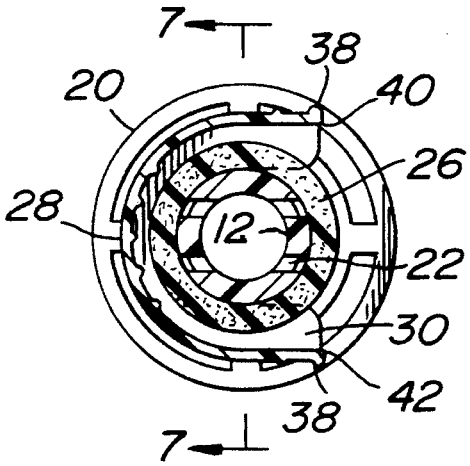
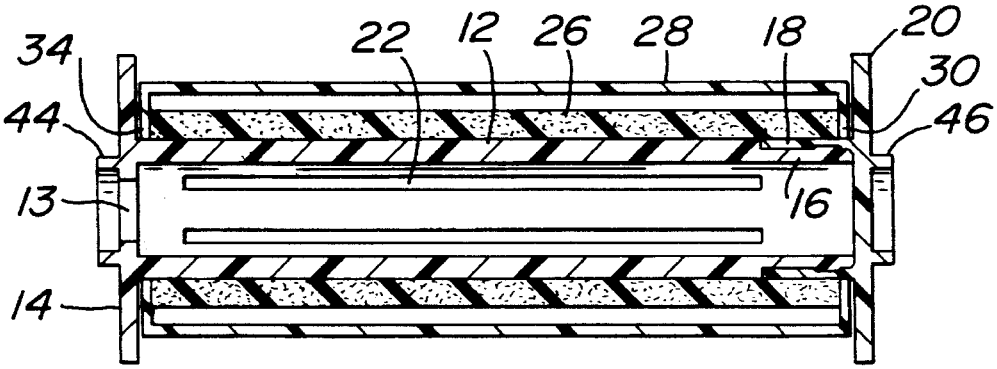
FIG. 7

FIG. 8
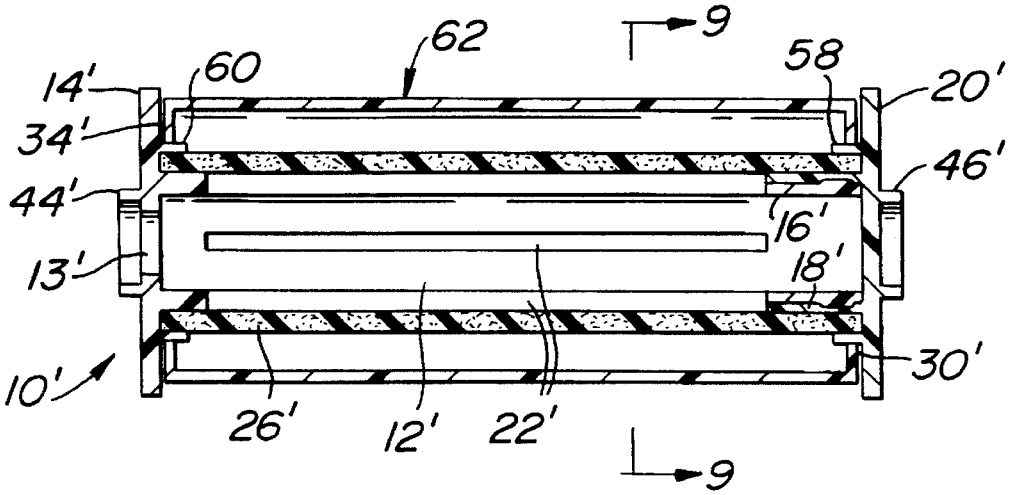
FIG. 11
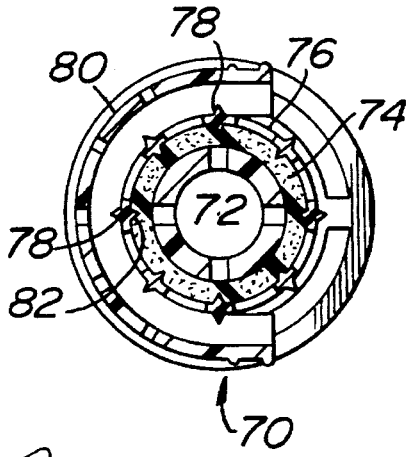
FIG. 9
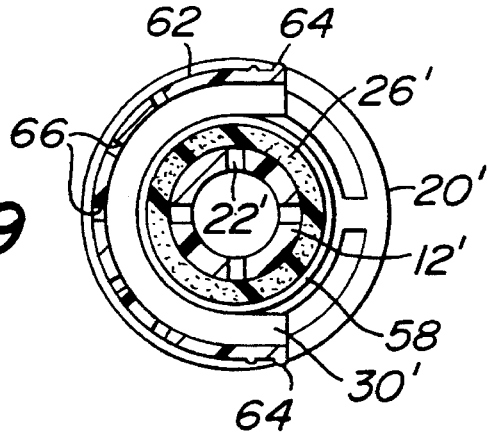
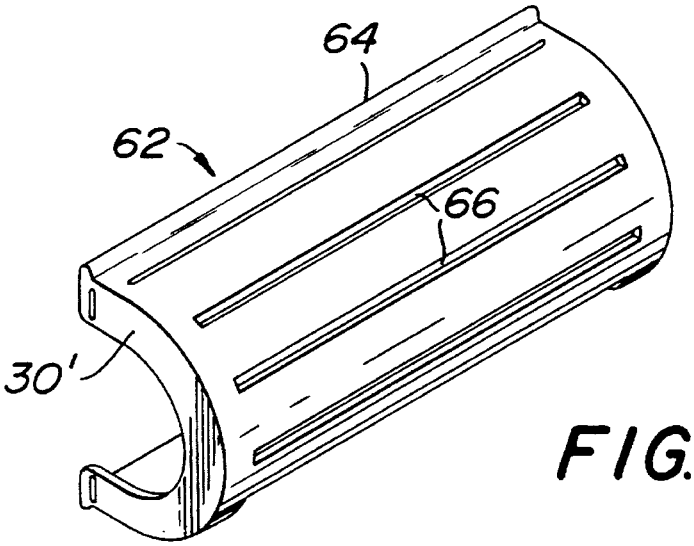
FIG. 10

HAIR CURLER

Matter enclosed in heavy brackets [ ] appears in the original patent but forms no part of this reissue specification; matter printed in italics indicates the additions made by reissue.

*This is a continuation of application Ser. No. 07/374,934, filed Jun. 29, 1989 now abandoned, which is a reissue of Ser. No. 06/864,538 filed on Feb. 7, 1983 now U.S. Pat. No. 4,453,554.*

BACKGROUND OF THE INVENTION

Hair curlers of the general type involved herein are known. See my U.S. Pat. No. 3,759,271 dated Sep. 18, 1973 entitled Hair Curler. The present invention is directed to an improved hair curler which resolves a number of problems associated with the hair curler disclosed in said patent and which are only ascertainable after substantial experience with the use of said hair curler.

While the hair curler disclosed in said patent has been satisfactory, I have found a number of ways to make the hair curler more superior and easier to use. The structural features involved will be described in greater detail hereinafter.

SUMMARY OF THE INVENTION

The present invention is directed to a hair curler adapted for use with steam. The hair curler includes a hollow perforated core. The core has an opening at one end through which steam can be introduced. A porous plastic sleeve surrounds the core. A rim is provided at each end of the core. The diameter of the rim is greater than the diameter of the core. At least one rim is releasably connected to the core. An annular boss is provided on each rim outer surface. Each boss is coaxial with said opening.

The present invention is directed to a hair curler for use with steam which is easier to manufacture and easier to use than the prior art.

Other objects and advantages of the present invention will appear hereinafter.

For the purpose of illustrating the invention, there is shown in the drawings a form which is presently preferred; it being understood, however, that this invention is not limited to the precise arrangements and instrumentalities shown.

FIG. 1 is a perspective view of a hair curler in accordance with the present invention.

FIG. 2 is an exploded view showing the complements of the hair curler.

FIG. 3 is a perspective view showing hair being wound around the hair curler.

FIG. 4 is a perspective view showing the hair curler clipped to hair.

FIG. 5 is a vertical sectional view showing the hair curler mounted on the steamer.

FIG. 6 is a sectional view taken along the line 6—6 in FIG. 1.

FIG. 7 is a sectional view taken along the line 7—7 in FIG. 6.

FIG. 8 is a sectional view similar to FIG. 7 but showing another embodiment of the present invention.

FIG. 9 is a sectional view taken along the line 9—9 in FIG. 8.

FIG. 10 is a perspective view of the shield shown in FIGS. 8 and 9.

FIG. 11 is a transverse sectional view through a hair curler in accordance with a third embodiment of the present invention.

DETAILED DESCRIPTION

Referring to the drawings in detail, wherein like numerals indicate like elements, there is shown in FIG. 1 a hair curler in accordance with the present invention designated generally as 10. Hair curler 10 includes a core 12 integral at one end with a rim 14. The core 12 is hollow and has an inlet 13 at the end attached to the rim 14. See FIGS. 5 and 7. The core 12 has a reduced diameter portion 16 which telescopically receives a hub 18 on rim 20. See FIG. 7. It will be noted that the rim 20 does not have a hole coaxial with the hub 18. The outer diameter of hub 18 corresponds to the outer diameter of core 12.

The core 12 has a plurality of longitudinally extending slots 22 which terminate at the reduced diameter portion 16. Each of the rims 14, 20 has a plurality of arcuate slots 24. By making core 12 and rim 14 a one piece and hub 18 and rim 20 as a separate piece, manufacture of the roller 10 is simplified. A tubular pad or sleeve 26 surrounds the core 12. Pad 26 is preferably a foam polymeric plastic material so as to be highly porous and compressible. Pad 26 acts as a distributor of steam in all directions with respect to hair to be wound therearound. The tubular pad 26 is telescoped over the core 12 and then hub 18 is snapped onto the reduced diameter portion 16 with a friction fit.

A shield 28 is provided to minimize loss of steam. Shield 28 is generally semi-circular and has end walls 30, 34. A notch 32 is provided in end wall 30. A notch 36 is provided in end wall 34. The tranverse dimensions across the notches 32, 36 corresponds generally to the diameter of the core 12 and hub 18. The end walls 30, 34 have a slight interference, e fit with the inner surfaces of the rims 14, 20.

In order to facilitate rapid separation of the shield 28 from the remainder of the curler 10, there is provided a plurality of ribs or beads 38 adjacent the edge portions 40, 42 on the shield 28. The beads 38 provide a non-slip portion on the otherwise smooth plastic shield.

After a shield is removed and it is desired to unroll the curler from the hair 52, I have found that the easiest and fastest way to do this is to provide the outer surface of the rims 14, 20 with coaxial bosses 44, 46 respectively. With a thumb in boss 44 and a tip of the forefinger in boss 46, the fingertips act as an axel for unwinding the curler from the hair 52. Boss 44 performs an added function. A table top electrical steamer 48 has an outlet port 50. The outer diameter of boss 44 is slightly smaller than the diameter of outlet 50. In this manner, the boss 44 fits inside the outlet 50 and acts as a guide to be certain that inlet 13 is in direct communication with the steam within the table top steamer 48.

The hair curler 10 is preferably provided in sets of different diameters. A set of curlers of a small diameter would be used in connection with short hair, the intermediate diameter one would be used with hair of intermediate length, and the largest diameter set would be used with long hair to make large curls. The bosses 44, 46 should be coaxial with the longitudinal axis of the core 12 but need not be of the same diameter. Thus, boss 44 may be of larger diameter than the boss 46.

The hair curler 10 is used as follows. The core 12 with the pad 22 therearound is placed on a steamer as shown in FIG. 5. After a few seconds, the curler is removed and applied to hair 52 while the shield 28 is placed over the outlet 50 on the steamer 48. After hair 52 has been wound around the pad 26, a pin or clip 54 may be utilized to anchor the hair 52 to the rims 14, 20. Clip 54 is optional in the event that the shield is not used. The shield 28 may be positioned so as to embrace the hair 52 that is wound around the pad 26 in the disposition shown in FIG. 6. It will be noted that there is an annular space between the inner surface of shield 28 and the outer surface of pad 26 to accommodate the hair 52.

After a few minutes of being exposed to the steam escaping radially outwardly through slots 22 and pad 26, clip 54 if present is removed. Shield 28 when present is removed by grasping the beads 38. Thereafter, the curler is separated from the hair by putting the thumb in boss 44 and the tip of the forefinger in boss 46. As a pressure is applied in removing the hair curler, the hair curler spins and unwinds itself from the hair.

In FIGS. 8–10, there is illustrated another embodiment of the present invention wherein the hair curler is designated generally as 10'. Hair curler 10' is identical with the hair curler 10 except as will be made clear hereinafter. Corresponding elements are identified by corresponding prime numerals.

The rim 20' has a hub 58 coaxial with the hub 18'. The rim 14' has a hub 60 coaxial with the core 12'. The hubs 58, 60 overlie the adjacent end portions of the pad or sleeve 26'. This prevents the wearing out of the end portions of the pad 26' by repeaded contact with the notches in the end walls of the shield. The shield 62 has notches in its end walls 30', 34' which correspond to the outer diameter of the hubs 58, 60.

The free end portions of the shield 62 are provided with one or more beads or ridges 64 to prevent slippage between fingers and the shield 62 during removal of the shield 62. The shield 62 has a plurality of longitudinally extending slots 66. The slots 66 facilitate more rapid drying of hair by blowing hot air from a blower through the slots 66 while the shield 62 remains in a position embracing hair wound on the core 12'.

In FIG. 11 there is shown a sectional view of another embodiment of the present invention designated generally as 70. The hair curler 70 is identical with hair curler 10 except as will be made clear hereinafter. The hair curler 70 includes a slotted core 72 corresponding to core 12 and surrounded by a pad 74 corresponding to pad 26. A porous sleeve 76 surrounds the pad 74 and has outwardly extending projections 78 which contact the inner surface of the shield 80 and thereby act as a limit stop. The sleeve 76 may have inwardly extending projections 82 which partially enter pad 74 to prevent relative rotation between sleeve 76 and pad 74.

The sleeve 76 may be made porous to steam in any manner. Thus sleeve 76 may be made of plastic with cut out areas or slots. The projection 78 more effectively catch the hair 52 wound therearound and eliminate the need for a clip corresponding to clip 54. Hair curler 70 is otherwise identical with hair curler 10.

Each embodiment of the present invention has finger contact portions such as those defined by the bosses 44, 46 to facilitate rapid separation of the curler from the hair 52. The boss 46 need not be annular. In each embodiment of the present invention, there is frictional contact between the end walls of the shields and the inner surfaces of the rims as well as frictional contact between an axially extending surface and the surfaces of the notches in the end walls of the shields. The embodiments of the present invention are structurally interrelated in a manner which facilitates the need for less expensive molds to manufacture the hair curlers and more efficient relationship between the shield and the core and rims for steam retention, and facilitates more rapid removal of the curler from the hair after the hair has been curled.

The present invention may be embodied in other specific forms without deprting from the spirit or essential attributes thereof and, accordingly, reference should be made to the appended claims, rather than to the foregoing specification, as indicating the scope of the invention.

I claim:

1. A hair curler for use with steam comprising a hollow perforated core, said core having an opening only at one end, a [purous] *porous* sleeve around said core, a rim at each end of the core, the diameter of the rim being greater than the diameter of the core, at least one rim being releasably connected to the core, [and] a finger contact surface on the exterior surface of each rim, at least one of said finger contact surfaces being annular and coaxial with said opening, *and a shield which is generally semi-circular, said shield having end walls, each end wall having a notch, said end walls being juxtaposed to an associated rim and being between the rims while the core is received in said notches, an outer peripheral surface of the core engaging the surfaces of a notch in the end wall of the shield.*

[2. A hair curler in accordance with claim 1 including a shield which is generally semicircular, said shield having end walls, each end wall having a notch, said end walls being juxtaposed to an associated rim and being between the rims while the core is received in said notches.]

[3. A hair curler in accordance with claim 2 wherein the outer peripheral surface of the core engages the surfaces of a notch in the end wall of the shield.]

4. A hair curler in accordance with claim [2] *1* wherein each rim has an axially extending hub overlying an adjacent end portion of the sleeve, the outer periphery of each hub being in contact with a surface of the notch on the associated end wall of the shield.

5. A hair curler in accordance with claim [2] *1* including at least one ridge on the outer peripheral surface of the shield adjacent the free ends thereof to increase friction and facilitate rapid grasping of the shield.

6. A hair curler in accordance with claim [2] *1* including a plurality of passages in the shield to facilitate blowing hot air through said passages.

7. A hair curler in accordance with claim 1 including a second sleeve surrounding said first sleeve, said second sleeve having integral outwardly extending projections to facilitate catching hair.

8. A hair curler in accordance with claim 1 wherein each of said finger contact surfaces is an annular boss extending in opposite directions away from their associated rims and having a diameter corresponding generally to the diameter of the core.

9. A hair curler for use with steam comprising a hollow core having longitudinally extending slots, an opening at only one end of the core, a porous sleeve around said core, a rim at each end of the core, means cooperating with the outer periphery of said core to define an annular channel at each end of the core, each end of said sleeve extending into one of said annular channels *wherein said annular channels overlie each end of said sleeve*, a finger contact portion on the outer surface of each rim and extending away from the adjacent end of said core, one of said finger contact portions being annular and coaxial with said opening.

10. A hair curler for use with steam comprising a hollow perforated core, said core having an opening only at one end, a porous foam plastic tubular pad around said core, a rim at each end of the core, the diameter of the rim being greater than the diameter of the core, a finger contact surface on the exterior surface of each rim, each of said finger contact surfaces being annular and coaxial with said opening, a shield which is generally semi-circular, said shield having end walls, each end wall having a notch, said end walls being Juxtaposed to an associated rim and being between the rims while the core is received in said notches, *an outer peripheral surface of the core engaging surfaces of the notches in the end walls of the shield*, and at least one ridge on the outer peripheral surface of the shield adjacent the free ends thereof to increase friction and facilitate rapid grasping of the shield.

[11. A hair curler in accordance with claim 10 wherein the outer peripheral surface of the core engages the surfaces of a notch in the end wall of the shield.]

12. A hair curler in accordance with claim 10 wherein each rim has an axially extending hub overlying an adjacent end portion of the pad, the outer periphery of each hub being in contact with a surface of the notch on the associated end wall of the shield.

13. A hair curler in accordance with claim 10 including a plurality of passages in the shield to facilitate blowing hot air through said passages.

14. A hair curler in accordance with claim 10 including a sleeve surrounding said pad, said sleeve having integral outwardly extending projections to facilitate catching hair.

*15. A hair curler in accordance with claim 1 wherein the end walls of said shield frictionally contact inner surfaces of said rims.*

*16. A hair curler for use with steam comprising a hollow perforated core, said core having an opening only at one end, a porous sleeve around said core, a rim at each end of the core, the diameter of the rim being greater than the diameter of the core, at least one rim being releasably connected to the core, and a finger contact surface on the exterior surface of each rim, at least one of said finger contact surfaces being annular and coaxial with said opening, and a shield which is generally semi-circular, said shield having end walls, each end wall having a notch, said end walls being juxtaposed to an associated rim and being between the rims while the core is received in said notches, said shield being disposed between said rims, the end walls of the shield frictionally contacting inner surfaces of the rims.*

*17. A hair curler for use with steam comprising a hollow perforated core, said core having an opening only at one end, a porous sleeve around said core, a rim at each end of said core, a finger contact surface on the exterior surface of each rim, at least one of the finger contact surfaces being annular and coaxial with the opening, the diameter of the rim being greater than the diameter of the core, at least one rim being releasably connected to the core, a shield which is generally semi-circular and disposed between said rims, said shield having end walls, each end wall between said rims, said shield having end walls, each end wall having a notch, said end walls being juxtaposed to an associated rim and being between the rims while the core is received in said notches, an outer peripheral surface of the core frictionally contacting the surfaces of a notch in the end wall of the shield.*

*18. A hair curler in accordance with claim 17 wherein the end walls of said shield frictionally contact inner surfaces of said rims.*

*19. A hair curler for use with steam comprising a hollow perforated core, said core having an opening only at one end, a porous sleeve around said core, a rim at each end of the core, a finger contact surface on the exterior surface of each rim, at least one of the finger contact surfaces being annular and coaxial with the opening, the diameter of the rim being greater than the diameter of the core, at least one rim being releasably connected to the core, and a shield which is generally semi-circular, said shield having end walls, each end wall having a notch, said end walls being juxtaposed to an associated rim and being between the rims while the core is received in said notches, said shield being disposed between said rims, the end walls of the shield frictionally contacting inner surfaces of said rims.*

*20. A hair curler in accordance with claim 16, 17 or 19 wherein the finger contact surface projects axially outwardly from the exterior surface of each rim.*

*21. A hair curler in accordance with claim 16, 17 or 19 wherein the finger contact surface is a protrusion from the exterior surface of each rim.*

*22. A hair curler in accordance with claim 16, 17 or 19 wherein the finger contact surface is an annulus in the exterior surface of each rim.*

*23. A hair curler in accordance with claim 22 wherein the annulus is an annular boss that extends away from the exterior surface of each rim.*

*24. A hair curler in accordance with claim 1 wherein the outer peripheral surface of the core engages the surfaces of the notch in the end wall of the shield by frictional contact therebetween.*

* * * * *